United States Patent
McCreight et al.

(10) Patent No.: US 9,672,243 B2
(45) Date of Patent: *Jun. 6, 2017

(54) SCALABLE DEDUPLICATION SYSTEM AND METHOD

(71) Applicant: GUIDANCE SOFTWARE, INC., Pasadena, CA (US)

(72) Inventors: Shawn McCreight, Pasadena, CA (US); Frank Lin, Pasadena, CA (US); Prateek Arora, Glendale, CA (US); Kunjan Zaveri, Arcadia, CA (US); Jason Fredrickson, Pasadena, CA (US)

(73) Assignee: Guidance Software, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,615

(22) Filed: Nov. 2, 2015

(65) Prior Publication Data
US 2016/0055200 A1     Feb. 25, 2016

Related U.S. Application Data

(63) Continuation of application No. 12/543,494, filed on Aug. 18, 2009, now Pat. No. 9,176,964.

(60) Provisional application No. 61/089,791, filed on Aug. 18, 2008.

(51) Int. Cl.
*G06F 17/30* (2006.01)

(52) U.S. Cl.
CPC .. *G06F 17/30371* (2013.01); *G06F 17/30067* (2013.01); *G06F 17/30097* (2013.01); *G06F 17/30156* (2013.01); *G06F 17/30507* (2013.01); *G06F 17/30595* (2013.01)

(58) Field of Classification Search
None
See application file for complete search history.

(56) References Cited

U.S. PATENT DOCUMENTS

| | | | |
|---|---|---|---|
| 6,792,545 B2 | 9/2004 | McCreight et al. | |
| 7,996,371 B1 * | 8/2011 | Deshmukh | G06F 17/30156 707/692 |
| 2008/0098083 A1 * | 4/2008 | Shergill | G06F 17/30303 709/217 |

* cited by examiner

*Primary Examiner* — Hosain Alam
*Assistant Examiner* — Tuan-Khanh Phan
(74) *Attorney, Agent, or Firm* — SoCal IP Law Group LLP; Steven C. Sereboff

(57) ABSTRACT

A system and method for data deduplication includes a first computer device that determines duplicacy of a data item. If the data item is not a duplicate, the first computer device transmits a request to add an entry for the data item in a deduplication table of a deduplication database. The database adds the entry for the data item while enforcing uniqueness of data across one or more data fields of the deduplication table, where, in enforcing the uniqueness, the database denies an attempt by the second device to add an entry in the deduplication table for the same data item.

19 Claims, 5 Drawing Sheets

FIG. 2

| ID | LEVEL KEY | UNIQUENESS | |
|---|---|---|---|
| | | CONTENT HASH | METADATA HASH |
| 1 | 0 | 123 | ABC |
| 2 | 77 | 123 | ABC |
| 3 | 0 | 123 | DEF |

SCALABLE DEDUPLICATION SYSTEM AND METHOD

CROSS-REFERENCE TO RELATED APPLICATION(S)

This application is a continuation of U.S. patent application Ser. No. 12/543,494, filed on Aug. 18, 2009, now U.S. Pat. No. 9,176,964, which claims the benefit of U.S. Provisional Application No. 61/089,791, filed on Aug. 18, 2008, the contents of all of which are incorporated herein by reference.

FIELD OF THE INVENTION

This invention relates generally to eliminating redundant processing of data items, and more specifically, to identifying duplicacies of the data items in real time across multiple devices.

BACKGROUND OF THE INVENTION

U.S. Pat. No. 6,792,545 discloses a system and method for performing secure investigations of networked devices over a computer network, the content of which is incorporated herein by reference. In such a system, there may be multiple examining machines concurrently conducting investigations of the network. Such concurrent investigations may result in duplication of some of the search results. Although deduplication mechanisms currently exist to eliminate redundant data within a single device, existing deduplication mechanisms are not scalable to multiple devices that collectively and concurrently need to identify and eliminate redundancies of data items in real time. Accordingly, what is needed is a real-time deduplication mechanism across a scalable environment where multiple machines can be concurrently collecting against the same set of deduplication data.

SUMMARY OF THE INVENTION

According to one embodiment, the present invention is directed to a method for data deduplication in a computer system including first and second computer devices coupled to a central database device over a data communications network. The first computer device identifies a data item and performs a lookup of a deduplication table maintained by the central database device according to a duplicacy rule for determining duplicacy of the data item. In response to a determination based on the duplicacy rule that the data item is not a duplicate, the first computer device transmits a request to add an entry in the deduplication table for the data item. The central database device adds the entry for the data item while enforcing uniqueness of data across one or more data fields of the deduplication table in response to the request, where, in enforcing the uniqueness, the database device denies an attempt by the second device to add an entry in the deduplication table for the same data item.

According to one embodiment of the invention, the one or more data fields include a level field storing a level of uniqueness associated with the data item.

According to one embodiment of the invention, the one or more data fields include a content hash field storing a hash value of contents of the data item.

According to one embodiment of the invention, the one or more data fields include a metadata hash field storing a hash value of metadata associated with the data item.

According to one embodiment of the invention, the duplicacy rule limits the determining by the first computer device of the duplicacy of the data, to a predetermined uniqueness level. The level may be one of a user level and a case level.

According to one embodiment of the invention, the first computer device compares data stored in the one or more data fields of the deduplication table to data associated with the data item for determining the duplicacy of the data item.

According to one embodiment of the invention, the first computer device compares content hash values and metadata hash values for the data item against content hash values and metadata hash values stored in the deduplication table.

BRIEF DESCRIPTION OF DRAWINGS

FIG. 2 is a layout diagram of an exemplary deduplication table stored in a central deduplication database according to one embodiment of the invention;

DETAILED DESCRIPTION OF THE INVENTION

In general terms, embodiments of the present invention are directed to a deduplication system and method that allows for real time identification of duplicate data items within a given case or multiple cases, for a given user or multiple users, or globally across a network. The deduplication system is scalable to multiple devices that collectively and concurrently need to identify and eliminate redundancies of data items in real time. For example, in an investigation system where multiple examiner machines conduct concurrent investigations of target devices, one examiner machine may want to identify, in real time, data items already seen and processed by another examiner machine to avoid processing the same data item again.

Figure 1:
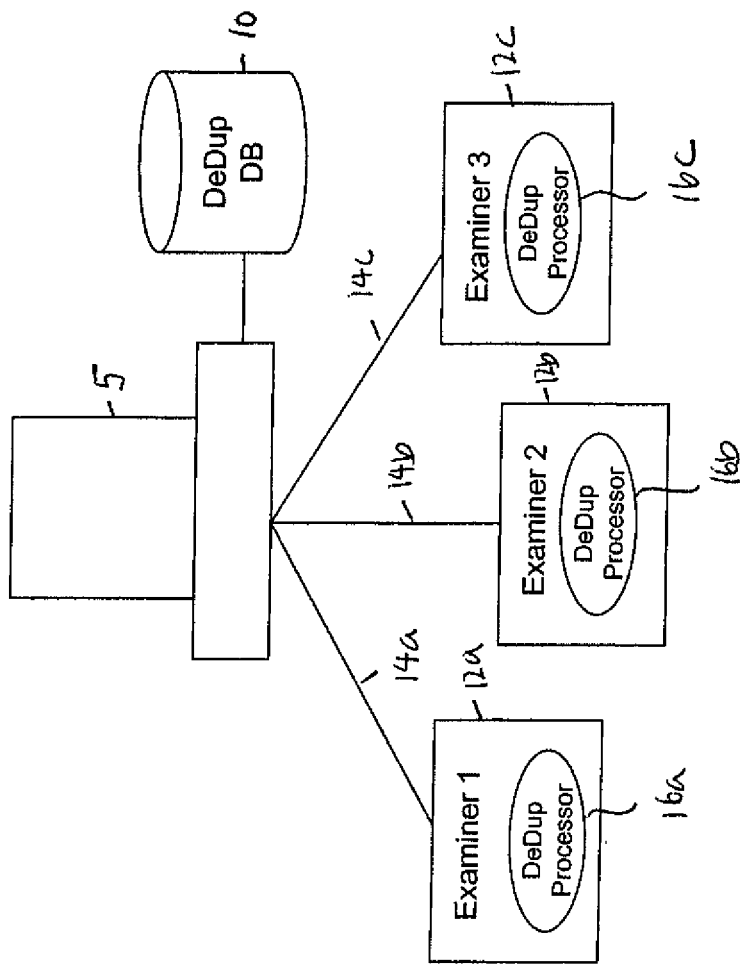
FIG. 1 is a schematic block diagram of a scalable deduplication system according to one embodiment of the invention.

FIG. 1 is a schematic block diagram of a scalable deduplication system according to one embodiment of the invention. The system includes one or more computer devices 12a, 12b, 12c (collectively referenced as 12), coupled to a central database server 5 across a data communication medium 14a, 14b, 14c (collectively referenced as 14). The computer devices 12 may be, for example, examiner devices conducting investigations of one or more target devices as described in further detail in the above-referenced U.S. Pat. No. 6,792,545. The data communication medium 14 may provide wired or wireless connections between the computer devices 12 and the central database server 5 across a local area network, private wide area network, the public Internet, or any other data communications network conventional in the art.

According to one embodiment of the invention, the database server 5 includes a central data storage device such as, for example, a disk drive or drive array, hosting a central deduplication database 10. The database 10 may be implemented according to any one of various well known database technologies conventional in the art. In this regard, the database server includes a microprocessor and a memory storing computer instructions associated with database management that are executed by the microprocessor to manage data in the central database 10. Such database management instructions include optimization techniques related to indexing and uniqueness as is described in further detail below. The database management instructions also allow searching of data stored in the database, as well as adding of data in the database. According to one embodiment of the invention, the database server 5 may be embodied as a SQL server or a Microsoft Database Engine conventional in the art.

According to one embodiment, each computer device 12 is configured with an instance of a deduplication processor 16a, 16b, 16c (collectively referenced as 16). Each deduplication processor may be microprocessor coupled to a local memory storing computer program instructions which allow the processor to detect full, partial, or no duplicates, of a specific data item, based on deduplication data maintained in the local memory and/or in the central database 10. Each processor is also configured to control the addition of entries into a deduplication table maintained in the local memory and/or the central database to allow real time deduplicaton at a level for which the processor has been instantiated, including global, case, and user deduplication levels.

The deduplication system according to the various embodiments leverages various optimization techniques provided by the database management software in the central database server 5. One such optimization technique is indexing. Indexing optimizes the lookup of data stored in the deduplication database by computing hash values of various keys stored in the database, and using each hash value as an index in an array to locate the desired location ("bucket") where the corresponding value should be.

Another optimization technique is uniqueness. Current database technology allows a database to be setup to implement uniqueness of data stored in the database, across one or more desired data fields.

FIG. 2 is a layout diagram of an exemplary deduplication table 20 stored in the central deduplication database 10 according to one embodiment of the invention. The table in the illustrated embodiment includes an ID field 22, level key field 24, content hash field 26, and metadata hash field 28. Of course, the table may also include other fields and/or eliminate one or more of the existing fields as will be apparent to a person of skill in the art.

The ID field 22 stores an ID assigned to a particular row/entry of the deduplication table 20. According to one embodiment of the invention, the database 10 automatically assigns the ID each time an entry is added to the deduplication table 20. The database may, for example, automatically increment a previous ID value and set the incremented value as the ID for a new entry.

The content hash field 26 stores hash values (e.g. an MD5 hash) of the contents of the data items encountered by the computer devices 12. The data item may be any data conventional in the art such as, for example, a file, record, entry, email, or the like. Such data items may be subject of investigation by the computer devices 12 during a forensic investigation session. The hash may be of the contents of the data (e.g. entire file) or specific aspects of the data (e.g. aspects of the file).

The metadata hash field 28 stores a hash value for a collection of certain properties of the data item. Such metadata may include, for example, dates, content hash, size, and the like, depending on the type of data item. Such metadata may be used, for example, to identify different instances of the same data content, which causes the system to return a partial duplicate instead of a full duplicate.

According to one embodiment of the invention, the table includes a level key field that identifies the level of deduplication being used by a particular deduplication processor 16. In this regard, each deduplication processor may be instantiated for a particular level of deduplication. For example, if a first deduplication processor 16a is instantiated to deduplicate at a global level (identified by level key value 0), an entry in the table 20 provided by the first deduplication processor includes the level key value 0 in the level key value field 24. This allows deduplication analysis to be performed at different levels, such as, for example, at a case level, custodian (user) level, or global level. For example, if a deduplication processor 16 instantiated for a particular case ID checks the database 10 for duplicacy of a data item, no duplicate is returned if the data item has not been encountered for the particular case ID, even if the data item may have been encountered for another investigation case having a different case ID.

According to one embodiment of the invention, the deduplication database 10 is setup via computer instructions implemented by the database server 5 to implement uniqueness 30 at a database level based on a combination of the level key 24, content hash 26, and metadata hash 28 fields. Once the database is setup in this manner, all entries in the deduplication table 20 are unique based on a combination of these fields. For example, an entry in the table that has a level key value "0," content hash value "123," and metadata hash value "ABC," will allow creation of an entry with level key value "0," content hash value "123," and metadata hash value "DEF," because although the content is identical at the identified level, the metadata differs and hence, is not a full duplicate.

Similarly, the database will allow creation of an entry with a level key value "77," content hash value "123," and metadata hash value "ABC," because although the content and metadata are identical, it is not a duplicate at the level indicated by the key value "77."

In enforcing uniqueness 30 in the database across the level key, content hash, and metadata hash fields, the database 10, via computer instructions executed by the database server 5, rejects any request to add entries into the table that defeats such uniqueness. In this regard, a message may be displayed on a display screen of the computer device 12 making the request indicating that the request has been denied. Accordingly, a request to add an entry in the database with a level key value "0," content hash value "123," and metadata hash value "ABC," will be rejected by the database as failing to enforce the uniqueness that the database has been configured to implement.

Figure 3:
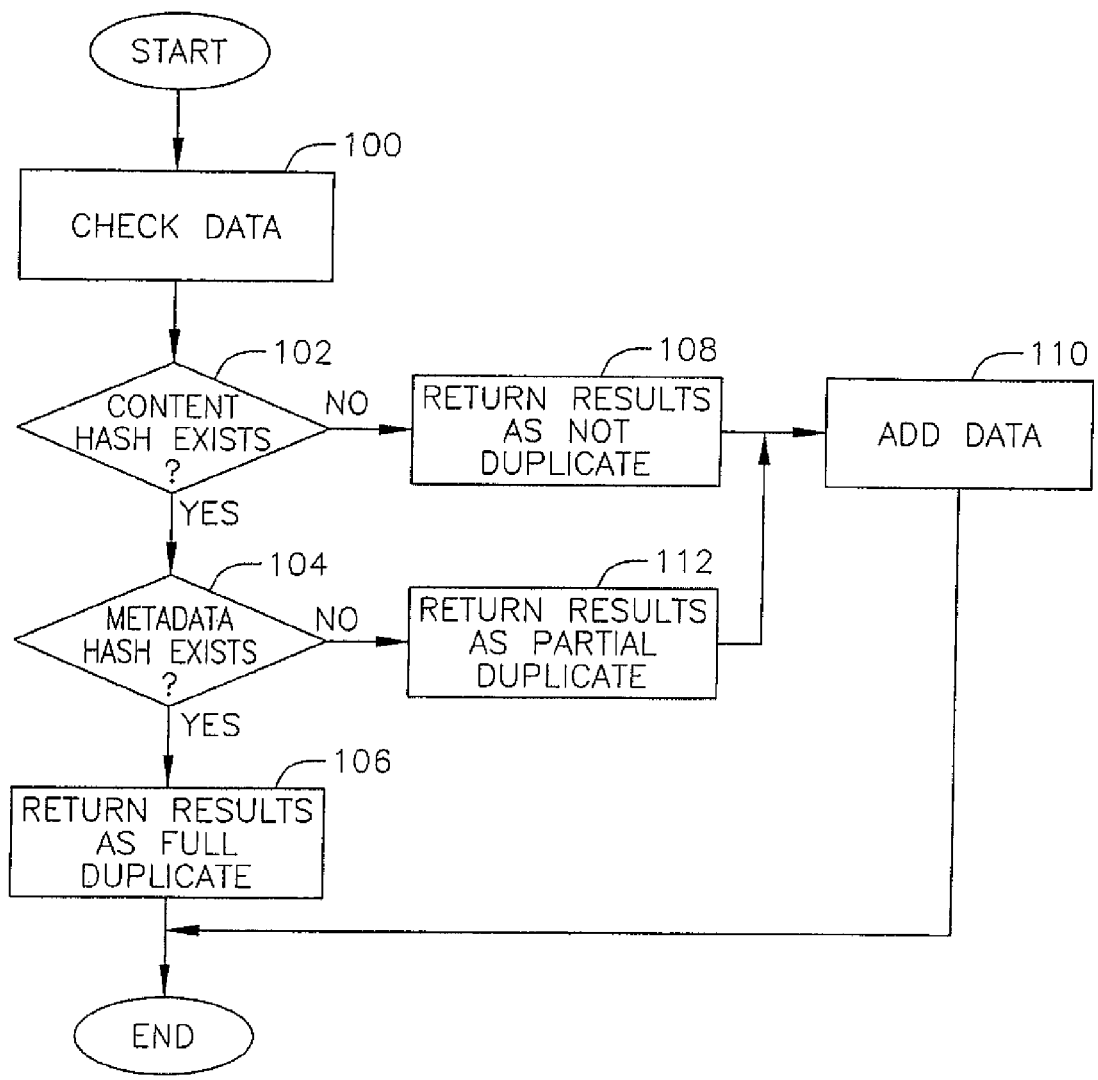
FIG. 3 is a flow diagram of a deduplication process executed by a deduplication processor according to one embodiment of the invention.

FIG. 3 is a flow diagram of a deduplication process executed by the deduplication processor 16 according to one embodiment of the invention. The steps in the process may be executed in the order indicated or in any other order appreciated by a person of skill in the art.

In step 100, the processor receives a request to check for duplicacy of a data item. The request may be initiated via a user input device, such as, for example, a keyboard or a mouse. According to one embodiment of the invention, the request includes a content hash and a metadata hash of the data item to be searched. The data item may be data that is being investigated in a forensic investigation session.

In response to the request, the processor 16 performs a lookup of the deduplication database 10 for the provided hash values according to a duplicacy rule/settings stored in its memory. According to one embodiment, the duplicacy rule limits the search of duplicates to the deduplication level in which the processor has been instantiated, and to the content hash and metadata hash fields. The duplicacy setting may also enable or disable partial duplicacies. In this regard, in step 102, the processor communicates with the database server 5 to invoke its database management software to perform a lookup, at the indicated level, of the content hash field using the indexing data for this field for optimization. The processor then determines whether the requested content hash is found in the content hash field of the database based on the results of the lookup.

If the content hash is not located in the database, the data item requested for lookup is not a duplicate at the level being considered, and the processor returns a result indicating no duplicacy in step 108.

When the computer device 16 receives the results of no duplicacy, it proceeds to process the data item as required. Alternatively, the computer device proceeds to immediately add the key level, content hash, and metadata hashes for the data item in the deduplication database 10 via an add command 110. If a processing is to be performed, such processing may be, for example, searching the data item for certain key words via a computer-implemented search algorithm run by the computer device, and outputting results of such processing to a display device coupled to the computer device.

After the processing is complete, the key level, content hash, and metadata hashes for the data item need to be stored in the deduplication database 10 to indicate to any other requesting device that this particular item has already been seen and processed at the indicated level. In this regard, if the deduplication database 10 were not to enforce uniqueness, the computer device would generally have to perform a check of the database for a second time to ensure that the information to be added was not a duplicate. This is would be the case even if the add command were transmitted right after receipt of confirmation of no or partial duplicates in the database 10. Although such a check was made during the check data step 100, there is a possibility that while the data item was being checked or later processed, another device could have processed the same data item and stored the corresponding hash values in the database for the indicated level. Only if the check indicates no duplicates would the device transmit an add command to the deduplication database. However, because there is no assurance that another device could have added to the database between the second checking of the database and the transmission of the add command, another check would have to be performed for duplicacies. Such checks would potentially be endless because of the absence of assurance that the entry to be added is unique.

In order to avoid such endless checking of the database, the central deduplication database 10 according to the various embodiments of the invention ensures uniqueness across the level key, content hash, and metadata hash fields of the deduplication table 20. Thus, an add command may be transmitted to the database 10, without a prior command to check the database for duplicates. When the database receives the add command, it only adds the requested entry if it can enforce the uniqueness across the fields for which it is configured to implement the uniqueness. Accordingly, in step 110, the deduplication database 10 receives the add command via the database server 5 and proceeds to add the level key for the instantiated level, content hash, and metadata hash to the database 10, while enforcing uniqueness across these fields.

With reference again to step 102, if a determination is made during the lookup step that the content hash exists in the database, a determination is made in step 104 as to whether the matching content's metadata hash value is also the same at the deduplication level. If the answer is YES, the returned results in step 106 indicate full duplicacy at the indicated level. Such results may be displayed, for example, on a display screen of the requesting computer device 12.

However, if the metadata hashes differ, the returned results in step 112 indicate partial duplicacy. Thus, in step 110, the deduplication database 10 adds the level key, content hash, and metadata hash to the database, while enforcing uniqueness across these fields.

Figure 4:
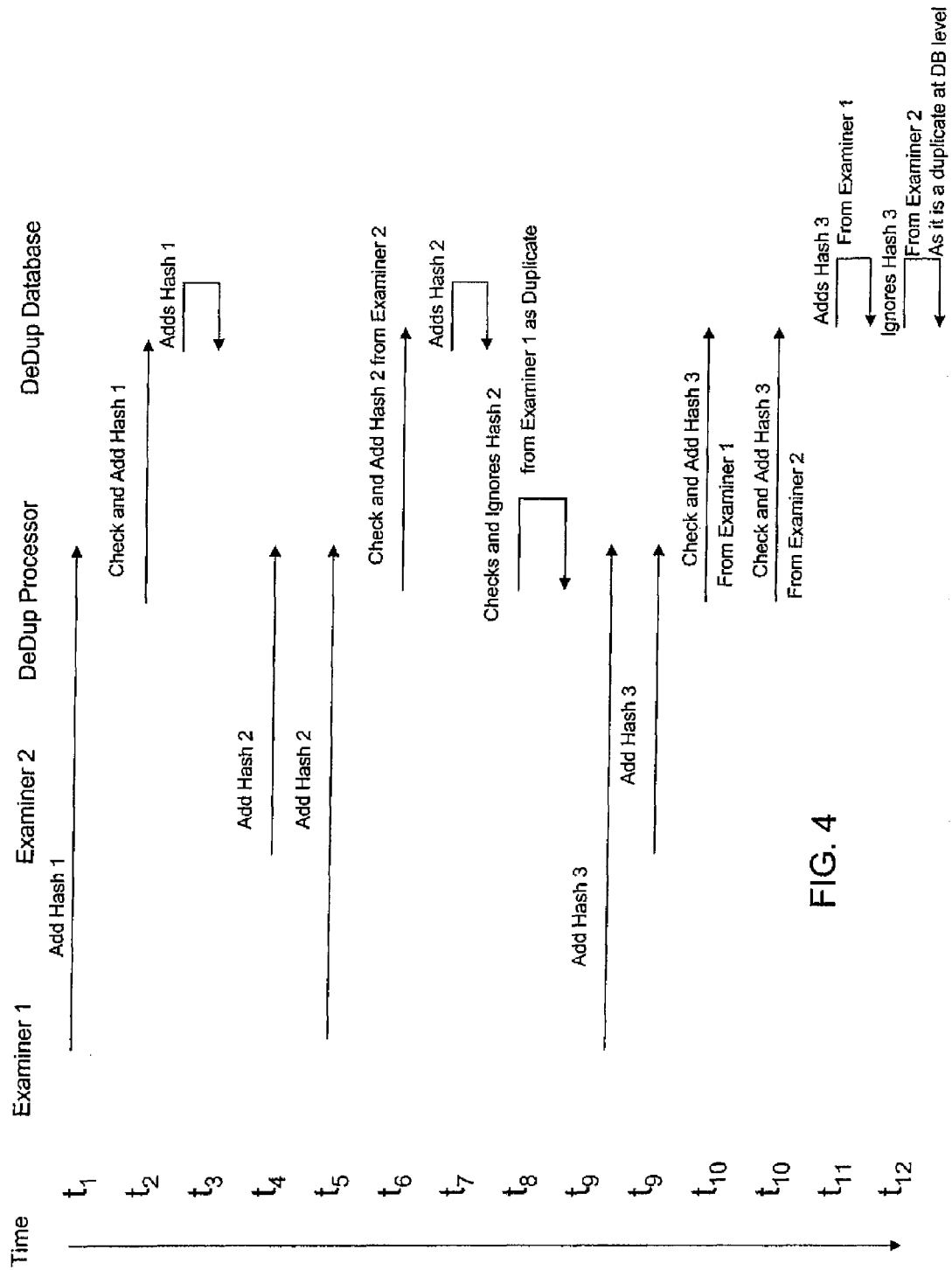
FIG. 4 provides different scenarios of adding hash values to a deduplication database while enforcing uniqueness according to various embodiments of the present invention.

FIG. 4 provides different scenarios of adding hash values to the deduplication database 10 while enforcing uniqueness according to various embodiments of the present invention. The time references in FIG. 4 may be any unit time or ranges of time units conventional in the art.

As seen in the illustrated time line, Hash 1 is added by the deduplication processor 16a in response to a command to add the data at time T1 as it is not a duplicate at the level of deduplication pre-set for the processor (global/case/job). In this regard, the deduplication processor 16a transmits an add command to the database server 5 at time T2 after checking for no duplicates.

At time T4, Examiner 2 tries to add Hash 2 and at time T5, Examiner 1 tries to add the same Hash 2. The deduplication processor 16b verifies in time T6 that Hash 2 from Examiner 2 is not a duplicate via a lookup request to the database, and adds the data to the database by transmitting an add command to the central database server 5. Although both the check and add commands are indicated as occurring in T6, it should be appreciated that the add command is followed by the check command. The two commands are not transmitted simultaneously. Furthermore, there may even be additional processing of the data between the check command and the add command which is not reflected in FIG. 4.

Once the data has been added, the deduplication processor 16a at time T8 checks the request to add Hash 2 from Examiner 1 and finds it to be a duplicate. Thus, the request from Examiner 2 is ignored.

In the third scenario from time T9, it may be seen that if two Examiners, Examiners 1 and 2, arrive at the same T9 and add Hash 3, the deduplication processor 16b for Examiner 2 checks the hash and takes care of deduplication at the database level. Thus, the database 10 adds Hash 3 from Examiner 1 and ignores Hash 3 from Examiner 2 as it is a duplicate at the database level. Alternatively; the database 10 may add Hash 3 from Examiner 2 and ignore Hash 3 from Examiner 1.

Specifically, in time T10, both the deduplication processor 16a for Examiner 1 and the deduplication processor 16b for Examiner 2 transmit a check command and both receive an indication that the deduplication database 10 does not contain Hash 3. In response, both the deduplication processor 16a for Examiner 1 and the deduplication processor 16b for Examiner 2 transmit an add command. Although this is reflected to occur at the same time period (T10) as the checking, it need not occur in the same time period.

The database 10 receives both add commands, and adds Hash 3 from Examiner 1 at T11. At T12, it does not add Hash 3 from Examiner 2 as doing so would not ensure uniqueness across the level key, content hash, and metadata hash fields of the deduplication table.

Figure 5:
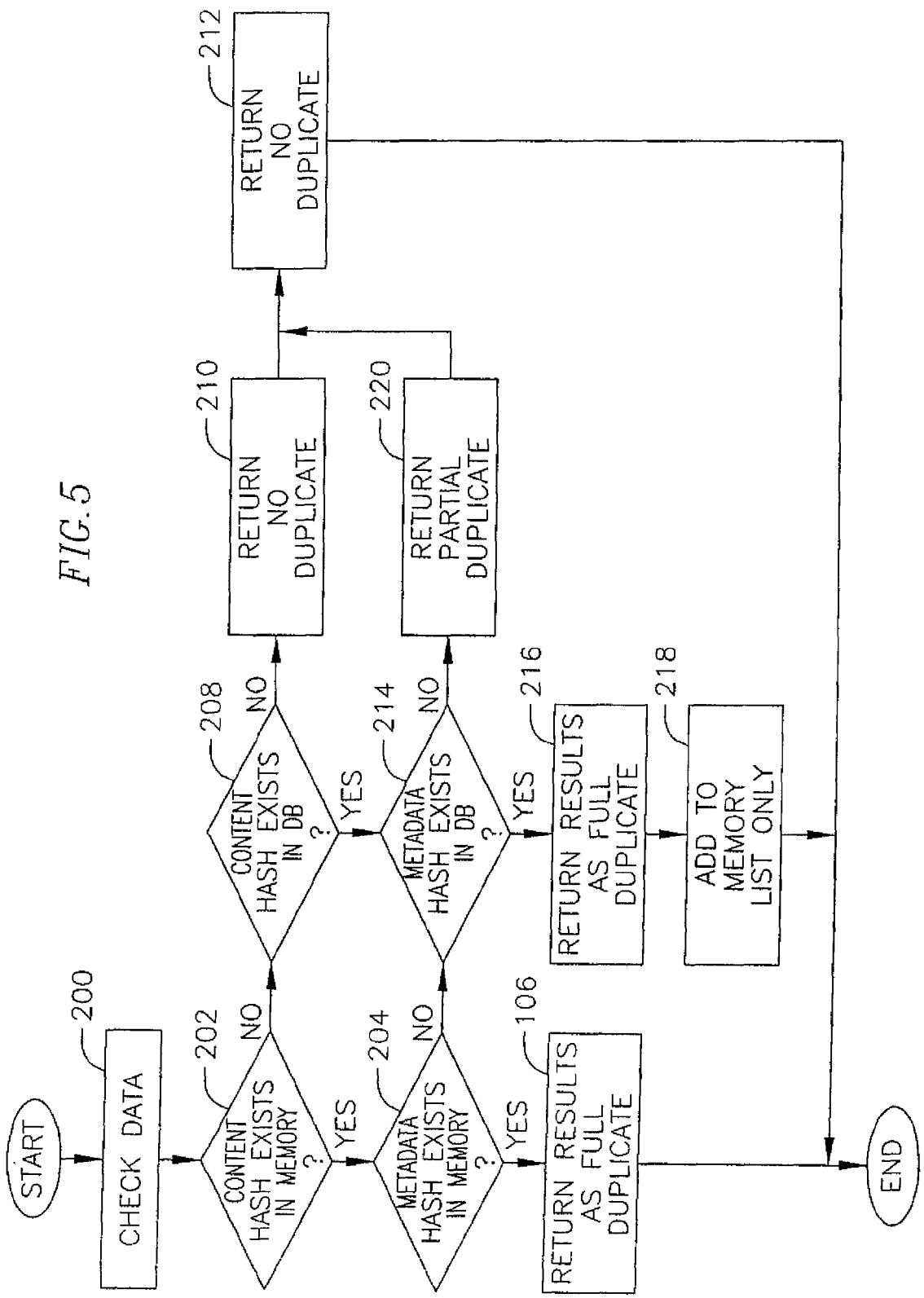
FIG. 5 is a flow diagram of a deduplication process executed by a deduplication processor according to another embodiment of the invention.

FIG. 5 is a flow diagram of a deduplication process executed by the deduplication processor according to another embodiment of the invention. According to this embodiment, the deduplication process maintains a deduplication table in its local memory, and checks this memory first for duplicacies before checking the central deduplication database. According to one embodiment of the invention, the deduplication table maintained in the local memory contains the same fields as the table maintained in the deduplication database.

In step 200, the deduplication processor receives a request to check for duplicacy of a data item. The request may be initiated via a user input device, such as, for example, a keyboard or a mouse. According to one embodiment of the invention, the request includes a content hash and a metadata hash of the data item to be searched.

In response to the request, the processor 16 performs a lookup of the deduplicaton table in the local memory for the hash values provided according to a duplicacy rule. According to one embodiment, the duplicacy rule limits the search of duplicates to the deduplication level in which the processor has been instantiated, and to the content hash and metadata hash fields. The duplicacy setting may also enable or disable partial duplicacies. In this regard, the processor, in step 202, performs lookup of the local table for the content hash at the instantiated level.

If the content hash is not located in the local table, a determination is made in step 208 as to whether the requested content hash is found in the central deduplication database 10. If the answer is NO, the data item requested for lookup is not a duplicate at the level being considered, and the processor 16 returns a result indicating no duplicacy in step 210.

In step 212, the deduplication processor adds the level key, content hash, and metadata hash to the local memory, and further invokes the central deduplication database 10 to add the same information while enforcing uniqueness across these fields.

If, however, the content hash is located in the deduplication database, a determination is made in step 214 as to whether the matching content's metadata hash value is also the same at the deduplication level. If the answer is YES, the returned results in step 216 indicate full duplicacy at the indicated level. The processor then proceeds to add, in step 218, an entry for the data item into the deduplication table located at the local memory only.

Referring again to step 214, if the matching content's metadata hash value is different based on the determination in step 214, the deduplication processor returns a result indicating partial duplicacy in step 220. An entry for the data item is then entered into the local memory and central deduplication database in step 212.

With reference again to step 202, if a determination is made that the content hash exists in the local memory, a determination is made in step 204 as to whether the matching content's metadata hash value is also the same at the instantiated deduplication level. If the answer is YES, the returned results in step 206 indicate full duplicacy at the instantiated deduplicaton level.

It is the applicants intention to cover by claims all such uses of-the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. In a computer system including first and second computer devices coupled to a central database device over a data communications network, the central database configured to enforce uniqueness of data across one or more fields of a deduplication table maintained by the central database, a method for data deduplication comprising:

identifying a first data item by the first computer device;

performing by the first computer device a lookup of the deduplication table maintained by the central database according to a rule for determining duplicacy of the first data item at a first deduplication level and determining if there is duplicacy, the deduplication table including a second entry for a second data item with content equal to content of the first data item, the second data item being associated with a second deduplication level different from the first deduplication level, wherein the second entry of the deduplication table stores a value corresponding to the content of the second data item;

in response to the lookup of the lookup table based on the rule, determining by the first computer device that either there is duplicacy or there is no duplicacy of the first data item at the first deduplication level;

in response to a determination that there is duplicacy of the first data item at the first deduplication level, enforcing uniqueness of data across the one or more data fields of the deduplication table in response to the request, wherein in enforcing the uniqueness, the central database denies an attempt to add a first entry in the deduplication table for the first data item at the first deduplication level;

in response to a determination that there is no duplicacy at the first deduplication level, transmitting by the first computer device a request to add a first entry in the deduplication table for the first data item; and adding by the central database the first entry for the first data item at the first deduplication level, wherein the adding includes storing a value in the deduplication table corresponding to the content of the first data item, wherein the value stored in the first entry is equal to the value stored in the second entry;

wherein one or more data fields of the deduplication table include a metadata hash field storing a hash value of metadata associated with the data item, wherein the metadata includes at least one of a size of the data item and a hash of the data item.

2. The method of claim 1, wherein one or more data fields of the deduplication table include a level field storing a level of uniqueness associated with the data item.

3. The method of claim 1, wherein one or more data fields of the deduplication table include a content hash field storing a hash value of contents of the data item, wherein the value corresponding to the content of the first or second data item is the hash value of the content of the first or second data item.

4. The method of claim 1, wherein the rule limits the determining by the first computer device of the duplicacy of the data, to the first deduplication level.

5. The method of claim 1, wherein the first deduplication level is associated with a user or case.

6. The method of claim 1, wherein the first computer device compares data stored in one or more data fields of the deduplication table to data associated with the data item for determining the duplicacy of the data item.

7. The method of claim 6, wherein the first computer device compares content hash values and metadata hash values for the data item against content hash values and metadata hash values stored in the deduplication table.

8. A system for data deduplication comprising:
central data store configured to store a deduplication table in a deduplication database and to enforce uniqueness of data across one or more fields of the deduplication table;
a first computer device, wherein the first computer device includes a processor and a memory operably coupled to the processor and storing program instructions therein, the processor being operable to execute the program instructions, wherein the program instructions cause the processor to:
identify a first data item;
perform a lookup of the deduplication table according to a rule for determining duplicacy of the first data item at a first deduplication level and determining if there is duplicacy, the deduplication table including an entry for a second data item with content equal to content of the first data item, the second data item being associated with a second deduplication level different from the first deduplication level, wherein the second entry of the deduplication table is configured to store a value corresponding to the content of the second data item;
in response to the lookup of the lookup table based on the rule, determine either there is duplicacy or that there is no duplicacy of the first data item at the first deduplication level;
in response to a determination that there is duplicacy at the first deduplication level, enforcing uniqueness of data across the one or more data fields of the deduplication table in response to the request, wherein in enforcing the uniqueness, the central database denies an attempt to add an entry in the deduplication table for the first data item at the first deduplication level;
in response to determining that there is no duplicacy at the first deduplication level, transmit a request to add a first entry in the deduplication table for the first data item, wherein in response to the request, the central database is configured to add the first entry for the first data item at the first deduplication level, wherein the adding includes storing a value in the deduplication table corresponding to the content of the first data item, wherein the value stored in the first entry is equal to the value stored in the second entry;
wherein one or more data fields of the deduplication table include a metadata hash field storing a hash value of metadata associated with the data item, wherein the metadata includes at least one of a size of the data item and a hash of the data item.

9. The system of claim 8, wherein one or more data fields of the deduplication table include a level field storing a level of uniqueness associated with the data item.

10. The system of claim 8, wherein one or more data fields of the deduplication table include a content hash field storing a hash value of contents of the data item, wherein the value corresponding to the content of the first or second data item is the hash value of the content of the first or second data item.

11. The system of claim 8, wherein the rule limits the determining by the first computer device of the duplicacy of the data, to the first deduplication level.

12. The system of claim 8 wherein the first deduplication level is associated with a user or a case.

13. The system of claim 8, wherein the first computer device is configured to compare data stored in one or more data fields of the deduplication table to data associated with the data item for determining the duplicacy of the data item.

14. The method of claim 1, wherein the determining that there is no duplicacy at the first deduplication level includes determining that the first data item is not a full duplicate at the first deduplication level.

15. The method of claim 14, wherein the determining that the data item is not a full duplicate includes:
determining that the content of the first data item is a duplicate at the first deduplication level, but metadata of the identified data item is not a duplicate at the first deduplication level.

16. The method of claim 15, wherein the deduplication table includes a content hash value computed for content of a stored data item, and a metadata hash value computed for metadata of the stored data item.

17. The method of claim 16, wherein the determining that the first data item is not a full duplicate includes:
comparing a hash value of the content of the first data item against the a hash value of the content of the second data item in the deduplication table and identifying a match; and
comparing a hash value of the metadata of the first data item against a hash value of the metadata of the second data item in the deduplication table and identifying a no match.

18. The method of claim 1 further comprising:
receiving data relating to content and metadata of the first data item, wherein the adding the entry for the first data item includes adding to respective fields of the deduplication table, a value for the first deduplication level, the value corresponding to the content, and a value for the metadata.

19. A method for data deduplication in a computer system including a first computer device coupled to a central database device, the central database configured to enforce uniqueness of data across one or more fields of a deduplication table maintained by the central database, wherein the deduplication table includes a metadata hash field storing hash values of metadata associated with the data item, wherein the metadata includes at least one of a size of the data item and a hash of the data item, the method comprising:
identifying a first data item by the first computer device;
the first computer device looking in the deduplication table for a duplicate of the first data item at a first deduplication level;
if there is a duplicate of the first data item at the first deduplication level, the first computer device causing no entry in the deduplication table for the first data item to be added;
if there is no duplicate of the first data item at the first deduplication level, requesting the central database to add a first entry in the deduplication table for the first data item at the first deduplication level including a value corresponding to content of the first data item and a hash of metadata associated with the first data item.

* * * * *